United States Patent [19]
Niebylski

[11] 3,808,063
[45] Apr. 30, 1974

[54] PREPARATION OF HIGH DENSITY BERYLLIUM HYDRIDE

[75] Inventor: Leonard M. Niebylski, Birmingham, Mich.

[73] Assignee: Ethyl Corporation, Richmond, Va.

[22] Filed: Aug. 21, 1968

[21] Appl. No.: 754,503

[52] U.S. Cl............... 149/109, 260/665 R, 423/645
[51] Int. Cl. .......................... C06d 1/04, C01b 6/04
[58] Field of Search ........ 23/204; 149/109; 423/645

[56] References Cited
OTHER PUBLICATIONS
Wood et al., J. Electrochem. Soc., Vol. 104, pp. 29 to 37 (1957).

Primary Examiner—Leland A. Sebastian
Attorney, Agent, or Firm—Donald L. Johnson; John F. Sieberth; Lewis Hess

[57] ABSTRACT

Certain alkali metal and alkaline earth metal fluorides and finely divided beryllium metal are effective as secondary crystallization additives to lithium-doped beryllium hydride. They induce crystallization at relatively low pressures in relatively short times. The beryllium metal can be introduced by controlled overpyrolysis of beryllium alkyl in the standard solution pyrolysis process for preparing beryllium hydride.

18 Claims, No Drawings

PREPARATION OF HIGH DENSITY BERYLLIUM HYDRIDE

BACKGROUND OF THE INVENTION

This invention relates to a novel process for the preparation of crystalline beryllium hydride.

Beryllium hydride has been synthesized by Coates and Glockling [J. Chem. Soc. 2526 (1954)] by the pyrolysis of ditertiary butyl beryllium etherate and by Head, Holley and Rabideau [J. Am. Chem. Soc. 79, 3687 (1957)] using ether-free ditertiary butyl beryllium. Later a superior product was obtained by the pyrolysis of ditertiary butyl beryllium etherate dissolved in a high-boiling inert solvent (copending application Ser. No. 176,865, filed Feb. 26, 1962).

Because of its high reducing power and low molecular weight, beryllium hydride is of great interest as a potential fuel component of solid rocket propellants. For this utility a relatively high density is of great importance. The beryllium hydride products of the above synthetic processes are without exception amorphous in structure and as a result are characterized by a relatively low density, 0.63 to 0.67 gram per cc, which limits their suitability for this application.

More recently (copending application Ser. No. 392,677, filed Aug. 24, 1964) a high-density composite containing crystalline beryllium hydride was prepared by treating amorphous beryllium hydride at elevated temperature and pressure with a dopant or crystallization catalyst containing lithium hydride or lithium aluminum hydride. This process required operating temperatures of from about 150° to about 300°C. and crystallization pressures ranging from about 100,000 to about 500,000 psig. Such temperatures and pressures required the use of expensive, specially designed equipment and special safety measures. Accordingly, it is an object of the present invention to provide a process for the preparation of crystalline beryllium hydride which can be carried out under pressures lower than those hitherto used and which can therefore make use of simplified, less expensive equipment for the production of those pressures and simultaneously reduce the hazards associated with the use of such pressures.

A further object of this invention is to provide a novel method for the preparation of crystalline beryllium hydride. Additional objects will appear hereinafter.

SUMMARY OF THE INVENTION

In accordance with the present invention, it has been found that, when amorphous beryllium hydride containing relatively minor amounts of certain lithium compounds, and certain metal fluorides or finely divided beryllium metal or both, is subjected to compaction at elevated temperature and pressure, the hydride is converted to a crystalline material of significantly higher density than the amorphous beryllium hydride similarly compacted in the absence of additives. A number of lithium compounds have been found effective for inducing crystallization via compaction and a number of different metal fluorides have been found useful as cocatalysts for reducing the crystallization pressure. The foregoing process constitutes an embodiment of the present invention.

DESCRIPTION OF THE PREFERRED EMBODIMENTS

A preferred embodiment of the present invention comprises using as starting material in the above-described process amorphous beryllium hydride containing from about 0.5 to about 20.0 mole percent of either lithium hydride or lithium aluminum hydride and from about 2 to about 5 weight percent, based on the amorphous composite of beryllium hydride and lithium compound, of an alkali or an alkaline earth metal fluoride, bismuth trifluoride, silver monofluoride or a mixture of two or more such fluorides, and heating the above starting material at from about 150° to about 300°C. under a pressure of from about 30,000 to about 100,000 psig for 5 minutes to about 2 hours to produce a crystalline composite.

The beryllium hydride used as starting material in the foregoing preferred embodiment can be prepared by pyrolysis of a ditertiary alkyl beryllium etherate in an inert solvent and in the presence of lithium hydride, lithium aluminum tetrahydride or an alkyl lithium. When this is done, it is preferred to introduce the fluoride or fluorides prior to pyrolysis of the beryllium alkyl, because this procedure provides a simple way of assuring relatively uniform distribution of the fluorides in the alkyl and, consequently, in the pyrolysis product. However, it is entirely possible to introduce them just before compacting.

Thus, another embodiment of this invention is the process of preparing crystalline beryllium hydride by pyrolyzing, in an inert solvent and at a temperature in the approximate range of 180° to 210°C., a mixture of a ditertiary alkyl beryllium etherate wherein each alkyl radical contains from four to about 20 carbon atoms with about 0.5 to 20 mole percent of an alkyl lithium containing from two to eight carbon atoms, the pyrolysis being carried out under an inert atmosphere, separating the insoluble pyrolysis product, mixing it with from about 2 to about 5 weight percent, based on said product, of an alkali or an alkaline earth metal fluoride, bismuth trifluoride or silver monofluoride and heating the resulting mixture at a temperature of from about 150° to about 300°C., under a pressure of from about 30,000 to about 100,000 psig and for a period ranging from about 5 minutes to about 2 hours, and allowing the material to cool to near ambient temperature while the pressure is maintained.

Another embodiment of the present invention is the process of heating, at a temperature and under a pressure within the above-cited ranges, amorphous beryllium hydride containing from 0.5 to about 20 mole percent of a lithium compound of one of the types described above and from 1 to about 10 weight percent of finely divided beryllium metal.

Still another embodiment of the present invention is the process of heating, at a temperature and under a pressure within the above-cited ranges, amorphous beryllium hydride containing from 0.5 to about 20 mole percent of a lithium compound of one of the types described above, from 1 to about 10 weight percent of finely divided beryllium metal, and from 2 to about 5 weight percent of one or more of the above-mentioned fluorides, both weight percentage ranges being based on the amorphous composite of beryllium hydride and lithium compound.

A particularly preferred embodiment of this invention is the process of preparing crystalline beryllium hydride by pyrolyzing, in an inert solvent and at a temperature in the approximate range of 180° to 210°C., a mixture of a ditertiary alkyl beryllium etherate wherein each tertiary alkyl radical contains from four to about 20 carbon atoms with about 0.5 to about 20 mole percent of n-butyl lithium and from about 0.06 to about 0.32 percent, based on the weight of the etherate-lithium alkyl mixture, of an alkali or an alkaline earth metal fluoride, bismuth trifluoride or silver monofluoride, the pyrolysis being carried out under an inert atmosphere, separating the insoluble pyrolysis product and heating the latter at a temperature of from about 150° to about 300°C., under a pressure of from about 30,000 to about 100,000 psig and for a period ranging from about 5 minutes to about 2 hours, and allowing the material to cool to near ambient temperature while the pressure is maintained.

This procedure is particularly preferred because it provides for uniform distribution of the lithium additive in the unfused beryllium hydride by mixing the additive and the beryllium hydride precursor in dissolved form, and for the substantially uniform distribution of the fluoride additive by suspension in the resulting solution. Such uniformity leads to a product of particularly desirable properties.

Another particularly preferred embodiment of this invention is the process of preparing crystalline beryllium hydride by pyrolyzing, in an inert high-boiling solvent, under an inert atmosphere and at a temperature in the approximate range of from about 180° to about 210°C., a mixture of a ditertiary alkyl beryllium etherate wherein each tertiary alkyl radical contains from four to about 20 carbon atoms and from about 0.5 to about 20 mole percent of a lithium alkyl containing from two to about eight carbon atoms, separating the insoluble pyrolysis product, heating the latter for a period of from 2 to about 60 minutes at from about 200° to about 300°C. and under a pressure of from about 5 millimeters of mercury to about 10 atmospheres to decompose part of the beryllium hydride to beryllium metal, immediately cooling the resulting hydride-metal composite to a temperature low enough to inhibit further decomposition thereof, heating the hydridemetal composite at from about 150° to about 210°C. under a pressure of from about 50,000 to about 85,000 psig for a period of from about 10 to about 30 minutes and allowing the product to cool to near ambient temperature while the pressure is maintained.

Still another preferred embodiment of this invention is the process of preparing crystalline beryllium hydride by pyrolyzing, in an inert solvent, under a pressure of from about 5 millimeters of mercury to about 10 atmospheres, at a temperature of from about 200° to about 300°C., and for a period of from about 2 to about 60 minutes, a mixture of a ditertiary alkyl beryllium etherate wherein each tertiary alkyl radical contains from 4 to 20 carbon atoms and from about 0.5 to about 20 mole percent of lithium hydride, lithium aluminum tetrahydride or an alkyl lithium containing from two to about eight carbon atoms, thus producing beryllium hydride and simultaneously decomposing a portion thereof to beryllium metal, cooling the resulting hydride-metal composite to prevent further decomposition, subjecting the composite to a pressure of from about 50,000 to about 85,000 psig, heating the composite under this pressure for a period of from about 10 to about 30 minutes at from about 150° to about 210°C., and cooling the composite under the above pressure to ambient temperature.

Other embodiments will appear hereinafter.

The process of this invention exhibits a number of significant advantages over processes previously disclosed. The primary advantage is that this process can be carried out under pressures of 30,000 to 100,000 pounds per square inch gauge, which are considerably below the pressures hitherto required. The use of lower pressures makes possible in turn the use of less expensive equipment than that previously required together with improved safety, ease of manipulation and throughput capacity.

The invention will be more fully understood by reference to the following set of illustrative examples in which, unless otherwise specified, all parts and percentages are by weight.

EXAMPLE 1

A solution of 1.6 parts of n-butyl lithium in 10.0 parts of hexane was dissolved in 197 parts of ditertiary butyl beryllium etherate prepared by the reaction of tertiary butyl Grignard reagent with beryllium chloride in ether solution. To the solution was added 0.33 part of anhydrous potassium fluoride. The mixture was introduced dropwise under an atmosphere of dry nitrogen into 750 parts of dodecane heated to 200° to 205°C. The addition required about 10 minutes for completion, after which the system was maintained at the above temperature of an additional 10 minutes. The beryllium hydride product was removed by filtration, washed with petroleum naphtha, and dried for 1 hour at 100°C. under a reduced pressure of 80 millimeters of mercury. The product contained associated lithium hydride (by decomposition of n-butyl lithium) and potassium fluoride. X-ray diffraction analysis showed the product to be largely amorphous.

A small sample of the product was placed in a ½-inch tempered steel die and a piston inserted while die and sample were still under nitrogen. The die and piston were encased in a section of pipe bellows fitted with a nitrogen flush and transferred to a mechanical press having heating means, temperaturemeasuring means, and pressure-measuring means. After the sample had been placed under a pressure of about 100,000 psi, heat was applied until the piston temperature reached 200°C. The system was left at this temperature and pressure for about 15 minutes. After the die had been cooled to below 60°C., the pressure was released and the pellet was pressed out into a nitrogen-flushed plastic bottle.

The density of the pressed product, determined by the sink-float method, was 0.77 gram per cc. Purity by hydrolysis was 80.0 percent by weight.

The sink-float method consists simply of adding a lump of material to a hydrocarbon suspension medium and varying the temperature until the particle begins to sink or to float. The temperature at which this occurs is recorded and the density of the solvent (equal to the density of the solids) is determined from a preconstructed curve for which the density-temperature relationship has been determined. Benzene, nonane, 1,3,5-trimethylbenzene (mesitylene) and methylcyclohexane were the solvents used.

A sample of the product, introduced into a glass capillary, was subjected to X-ray diffraction analysis using a Phillips Norelco X-ray unit equipped with a 114.59-millimeter powder camera. A copper source at 40 kilovolts and 20 milliamperes was employed using a 3-hour exposure. The X-ray diffraction pattern was characterized by the presence of numerous intense lines indicative of a high degree of crystallinity. The strongest lines were found at $d = 3.38$ and $d = 2.08$ A.

When the n-butyl lithium in the above example is replaced by tertiary butyl lithium, n-hexyl lithium, isooctyl lithium, n-decyl lithium, lithium hydride, or lithium aluminum hydride, similar results are obtained.

When the potassium fluoride in the above example is replaced by lithium fluoride, sodium fluoride, rubidium fluoride, cesium fluoride, calcium fluoride, strontium fluoride, barium fluoride, bismuth fluoride or silver fluoride, similar results are obtained.

When the pressure-crystallization step of the process of the above example was carried out under approximate pressures of 50,000 and 85,000 pounds per square inch gauge, similar results were obtained.

EXAMPLE 2

A solution of n-butyl lithium in hexane was dissolved in ditertiary butyl beryllium etherate as in Example 1, but no potassium fluoride or other additive was used. The pyrolysis was carried out in n-dodecane as indicated but the mixture was deliberately overpyrolyzed by heating under a pressure of 50 millimeters of mercury and at a temperature of 250°C. for 20 minutes to give an amorphous beryllium hydride product containing about 7.4 percent by weight of free beryllium metal.

A small sample of the product was pressed in a die as in Example 1 but under a pressure of 85,000 psi to yield a pressed product (Sample 1) having a density by the sink-float method of 0.78. A sample treated as in Example 2 above but without overpyrolysis (free beryllium metal content less than 1 percent) yielded, upon compaction at 85,000 psi, a pressed product (Sample 2) having a density of 0.70 to 0.72. X-ray diffraction analysis showed that the products differed greatly in crystallinity. Both contained crystalline material as indicated by lines at $d = 3.38$ and $d = 2.08$ A but the non-overpyrolyzed sample also contained a considerable amount of amorphous material, as indicated both by diffuse diffraction bands and by lower density, whereas the overpyrolyzed sample gave no indication of non-crystalline material.

EXAMPLES 3 – 17

The following examples show the results of employing as crystallization co-catalysts, both finely divided beryllium and one or more of the metal fluorides described above. The procedural details are similar to those used in Examples 1 and 2 These results are tabulated below.

Examination of the above table shows a number of interesting relationships.

Thus, the X-ray diffraction results indicate the desirability of using a crystallization pressure in the range of 50,000 to 100,000 psig, since pressures in the 30,000 psig range yielded, using the system and conditions of Example 10, only small amounts of crystalline beryllium hydride (below the sensitivity limits of the X-ray diffraction analysis procedure).

As shown by comparison of Examples 4 and 5, sodium fluoride, in the presence of less than 1 percent of beryllium metal (the lower limit of analysis) produces significant amounts of a probably monoclinic crystalline form of beryllium hydride, up to 40 percent, based on the amorphous composite. In the presence of 7.4 percent of beryllium metal produced, as indicated above, by overpyrolysis of the beryllium alkyl etherate, crystallization is essentially complete, and the crystals exhibit the usual hexagonal form.

Examples 15 and 17 show that compaction of the overpyrolyzed hydride at 85,000 psig in the presence of bismuth trifluoride or silver monofluoride yields crystalline material as shown by increased density and diffraction lines.

TABLE

| Example No. | Wt. % Be[4] in BeH$_2$ | Additive[1] Type | Wt. %[2] | Pressure, psi/1000 | Temp., °C. | Time, Minutes | Product Density, g/cc | X-Ray Results: Phases Present |
|---|---|---|---|---|---|---|---|---|
| 3  | 7.4   | LiF  | 2.5 | 85  | 200 | 30 | 0.76 | — |
| 4  | 7.4   | NaF  | 2.5 | 85  | 200 | 30 | 0.80 | 3.38[3] |
| 5  | < 1.0 | NaF  | 2.5 | 85  | 200 | 30 | 0.78 | 60% amorphous + 40% 3.78[3] |
| 6  | 7.4   | RbF  | 3.0 | 100 | 200 | 20 | 0.80 | 3.38 |
| 7  | 7.4   | CsF  | 3.0 | 100 | 200 | 20 | 0.80 | 3.38 |
| 8  | 7.4   | CsF  | 1.0 | 85  | 200 | 20 | 0.74 | — |
| 9  | < 1.0 | CsF  | 2.5 | 85  | 190 | 30 | 0.80 | — |
| 10 | 7.4   | SrF$_2$ | 3.0 | 30  | 200 | 30 | 0.70 | SrF$_2$ only crystalline phase detected. |
| 11 | 7.4   | SrF$_2$ | 3.0 | 50  | 200 | 30 | 0.74 | SrF$_2$ + 3.38 |
| 12 | 7.4   | SrF$_2$ | 3.0 | 100 | 200 | 30 | 0.80 | 3.38 |
| 13 | 7.4   | BaF$_2$ | 3.0 | 100 | 200 | 20 | 0.84 | 3.38 |
| 14 | < 1.0 | BiF$_3$ | 2.5 | 85  | 190 | 30 | 0.76 | — |
| 15 | 7.4   | BiF$_3$ | 2.5 | 85  | 190 | 30 | 0.80 | 3.38 |
| 16 | 7.4   | AgF  | 2.5 | 50  | 190 | 90 | 0.71 | AgF only crystalline phase detected. |
| 17 | 7.4   | AgF  | 2.5 | 85  | 190 | 30 | 0.75 | 3.38 |

[1] All samples contain 2.5 weight percent lithium hydride, based on the BeH$_2$.
[2] Based on the weight of the BeH$_2$ composite.
[3] The symbol 3.38 represents one (hexagonal) crystalline form of the beryllium hydride-containing composite characterized by strong diffraction lines (in the order of their decreasing relative intensity) at d = 3.38A (I/Io = 100), 2.079(60), 1.347(10), 1.780(5), 3.22(3), 2.94(3), 2.84(3), 2.69(3), and 1.960(3). The symbol 3.78 represents a second (probably monoclinic) crystalline form characterized by strong diffraction lines at d = 3.78(100), 2.95(80), 2.07(40), 2.86(20), 1.966(10), 1.938(4), 1.720(4), 1.669(3), 1.349(3), 1.263(3), 1.192(3), 1.1396(3), 1.0917(3), and 1.835(2).
[4] Wt. % Be refers to Beryllium metal content present in BeH$_2$.

A considerable variety of organoberyllium compounds can be used in place of the ditertiary butyl beryllium etherate of Example 1; similar results are obtained. Included are all beryllium alkyls having in each alkyl radical four to about 20 carbon atoms and a tertiary carbon atom bonded to the beryllium atom. Examples of such compounds are bis(1,1-dimethylbutyl)beryllium, bis(1,1-dimethylhexyl)beryllium, bis(1,1,3,3-tetramethylbutyl) beryllium, bis(1,1-dimethyldecyl)beryllium, and bis(1,1-dimethyloctadecyl)beryllium. The ether of the etherate may be diethyl ether, dipropyl ether, dibutyl ether, dihexyl ether, or any similar ether containing not more than about 10 carbon atoms in each alkyl radical.

The amorphous beryllium hydride used in the process of this invention can be prepared by any method which yields a product of relatively high purity. The solution pyrolysis procedure described in Example 1 yields a highly satisfactory starting material.

A lithium compound used to initiate the crystallization can be mixed mechanically with the amorphous beryllium hydride but, as indicated above, is preferably dissolved in the beryllium alkyl prior to pyrolysis. The lithium initiator is suitably lithium hydride, lithium aluminum hydride, or an alkyl lithium compound containing from two to about eight carbon atoms, for example, ethyl lithium, n-propyl lithium, n-butyl lithium, tertiary butyl lithium, n-hexyl lithium, 2-ethyl hexyl lithium, isononyl lithium, or n-decyl lithium.

A wide range of concentrations of the lithium initiator compound can be employed. Thus, its concentration in the amorphous beryllium hydride can range from less than 0.5 to more than 20.0 mole percent. The preferred range of concentrations is from 1.0 to 5.0 mole percent because the sensitivity of the product to air and moisture varies directly with the lithium content and, at the higher lithium concentrations, this sensitivity poses a problem of handling the material without excessive decomposition. Lithium concentrations above 5 mole percent have no significant effect on crystallinity or density of the product.

The cocatalysts for beryllium hydride crystallization are fluorides of the alkali and alkaline earth metals, bismuth and silver. Thus, the cocatalysts may contain a fluoride of lithium, sodium, potassium, rubidium, cesium, beryllium, magnesium, calcium, strontium, barium, bismuth or silver or a mixture of the fluorides of two or more of these metals. Potassium fluoride is preferred because of its ready availability in the pure, anhydrous state. These cocatalysts may be present in amounts varying from less than two to more than five weight percent, based on the amorphous composite. Proportions of 2.5 to 3 weight percent are preferred because such proportions yield consistent and reliable results.

Further details concerning the step of forming the amorphous beryllium hydride are disclosed in copending application Ser. No. 176,865, filed Feb. 26, 1962 and, if desired, the process therein described may be used in conjunction with the present invention. The fluoride can be added in the process of the earlier invention, or of the present invention, before pyrolysis, as noted above, or after pyrolysis, by intimately mixing the pyrolysis product with the fluoride.

The novel over-pyrolysis step mentioned above comprises heating the solution pyrolysis product under a pressure of 5 millimeters of mercury to 10 atmospheres and at a temperature of from about 200° to about 300°C. for a period of 2 minutes to about 1 hour to produce a hydride-metal composite containing from 1 to about 10 weight percent of beryllium metal. A content of 5 to about 8 weight percent of beryllium metal is preferred because contents in this range lead readily to essentially complete crystallization of the beryllium hydride content of the resulting amorphous composite.

The crystallization process of this invention can be carried out at temperatures in the range of 150° to 300°C. Temperatures in the range of from 185° to 210°C. are preferred because this range is high enough to bring about crystallization of beryllium hydride within a reasonable operating time yet is low enough to prevent excessive thermal decomposition of the beryllium hydride itself.

Suitable pressures for the crystallization process range from about 30,000 to about 100,000 pounds per square inch. Optimum pressures within this range will vary to some extent depending upon the identity and quantity of the fluoride material present, if any, the quantities of beryllium metal, if any, and lithium compounds present and the temperature and the duration of compaction. Thus, when the process of the invention is carried out, a combination of operating conditions should be chosen to yield optimum crystallinity. In general, pressures in the range of from about 50,000 to about 85,000 pounds per square inch are preferred because crystallization occurs readily under these conditions and because these pressures and the equipment for producing them are readily available. When the fluoride present is, or contains a substantial proportion of, an alkaline earth metal fluoride, pressures in the range of from about 50,000 to about 100,000 pounds per square inch are preferred.

The time required for completion of the crystallization process of this invention is a complex function of the other variables but a period in the range from about 5 minutes to about 2 hours is generally satisfactory. Periods in the range of from about 10 to about 30 minutes are preferred because crystallization is essentially complete within this time range when values within their preferred ranges are used for the other variables.

The process of the invention may be carried out under any atmosphere inert to both the beryllium hydride and the lithium initiator compound. The use of dry nitrogen is preferred because of its availability and economy. Other suitable protective atmospheres include gaseous saturated hydrocarbons such as methane and ethane and the noble gases helium, neon, argon, krypton, and xenon.

Since the process of the invention involves reactants, intermediates and products which are more or less moisture sensitive, it is obvious that the system should be essentially anhydrous, and thus the feeds, solvents, suspension media and protective atmospheres should be dried, prior to use, to the maximum practical extent.

I claim:

1. The process for the preparation of a crystalline beryllium hydride-containing composite which comprises heating an amorphous composite, consisting essentially of from about 99.5 to about 80.0 mole percent of beryllium hydride and from about 0.5 to about 20.0 mole percent of lithium hydride or lithium aluminum hydride, at a temperature of from about 150° to about 300°C., under a pressure of from above about 30,000 to about 100,000 psig and for a period of from about 5 minutes to about 2 hours, with a catalytic substance comprising:
  a. from about 2 to about 5 weight percent of a fluoride selected from the group consisting of the fluorides of the alkali metals of atomic numbers from 3 to 55, inclusive, the fluorides of the alkaline earth metals of atomic numbers from 4 to 56, inclusive, bismuth trifluoride, silver monofluoride, and mixtures of two or more of said fluorides, or
  b. from about 1 to about 10 weight percent of finely divided beryllium metal, or
  c. a combination of one or more of said fluorides along with finely divided beryllium metal in the proportions hereinbefore set forth,
all weight percentages being based on said amorphous composite.

2. The process of claim 1 wherein said catalytic substance is as defined in (a) thereof.

3. The process of claim 1 wherein said catalytic substance is as defined in (b) thereof.

4. The process of claim 1 wherein said catalytic substance is as defined in (c) thereof.

5. The process of claim 1 wherein said catalytic substance is as defined in (a) thereof, the lithium compound is lithium hydride, said fluoride is potassium fluoride and is present in the proportion of from about 2.5 to about 3.0 weight percent, based on said amorphous composite, and said heating is carried out at a temperature of from about 185° to about 210°C., under a pressure of from about 50,000 to about 85,000 psig and for a period of from about 10 to about 30 minutes.

6. The process of claim 1 wherein said catalytic substance is as defined in (c) thereof, the lithium compound is lithium hydride, said fluoride is potassium fluoride in the proportion of from about 2.5 to about 3.0 weight percent and said beryllium metal is present in the proportion of from about 5 to about 8 weight percent, both based on said amorphous composite, and said heating is carried out at a temperature of from about 185° to about 210°C., under a pressure of from about 50,000 to about 85,000 psig and for a period of from about 10 to about 30 minutes.

7. The process of claim 1 wherein said catalytic substance is as defined in (c) thereof, the lithium compound is lithium hydride, said fluoride is lithium fluoride in the proportion of from about 2.5 to about 3.0 weight percent and said beryllium metal is present in the proportion of from about 5 to about 8 weight percent, both based on said amorphous composite, and said heating is carried out at a temperature of from about 185° to about 210°C., under a pressure of from about 50,000 to about 85,000 psig and for a period of from about 10 to about 30 minutes.

8. The process of claim 1 wherein said catalytic substance is as defined in (c) thereof, the lithium compound is lithium hydride, said fluoride is sodium fluoride in the proportion of from about 2.5 to about 3.0 weight percent and said beryllium metal is present in the proportion of from about 5 to about 8 weight percent, both based on said amorphous composite, and said heating is carried out at a temperature of from about 185° to about 210°C. under a pressure of from about 50,000 to about 85,000 psig and for a period of from about 10 to about 30 minutes.

9. The process of claim 1 wherein said catalytic substance is as defined in (c) thereof, the lithium compound is lithium hydride, said fluoride is rubidium fluoride or cesium fluoride in the proportion of from about 2.5 to about 3.0 weight percent and said beryllium metal is present in the proportion of from about 5 to about 8 weight percent, both based on said amorphous composite, and said heating is carried out at a temperature of from about 185° to about 210°C. under a pressure of from about 50,000 to about 100,000 psig and for a period of from about 10 to about 30 minutes.

10. The process of claim 1 wherein said catalytic substance is as defined in (c) thereof, the lithium compound is lithium hydride, said fluoride is strontium fluoride or barium fluoride in the proportion of from about 2.5 to about 3.0 weight percent and said beryllium metal is present in the proportion of from about 5 to about 8 weight percent, both based on said amorphous composite, and said heating is carried out at a temperature of from about 185° to about 210°C. under a pressure of from about 50,000 to about 100,000 psig and for a period of from about 10 to about 30 minutes.

11. The two-stage process for the preparation of a crystalline beryllium hydride-containing composite, which comprises,
  in the first stage, pyrolyzing, while in solution in a solvent inert under the reaction conditions with respect to reactants and products, and at a temperature in the range of from about 180° to about 210°C. sufficient to result in the formation of beryllium hydride, a mixture of a tertiary alkyl beryllium etherate wherein each tertiary alkyl radical contains from four to about 20 carbon atoms, about 0.5 to about 20 mole percent of a lithium compound selected from the group consisting of lithium hydride, lithium aluminum tetrahydride and an alkyllithium wherein the alkyl radical contains from two to about eight carbon atoms and from about 0.06 to about 0.32 percent, based on the sum of the weight of said etherates and said lithium compound, of a fluoride selected from the group consisting of the fluorides of the alkali metals of atomic numbers from 3 to 55, inclusive, the fluorides of the alkaline earth metals of atomic numbers from 4 to 56, inclusive, bismuth trifluoride, silver monofluoride and mixtures of two or more of said fluorides, the pyrolysis being carried out under an atmosphere inert under the reaction conditions with respect to reactants and products and separating the insoluble pyrolysis product; and
  in the second stage, heating said pyrolysis product from the first stage at a temperature of from about 150° to about 300°C., under a pressure of from about 30,000 to about 100,000 psig and for a period of from about 5 minutes to about 2 hours to produce a crystalline beryllium hydride-containing composite and cooling said composite to ambient temperature while maintaining said pressure.

12. The process of claim 11 wherein said lithium compound is n-butyl lithium, said metal fluoride is potassium fluoride and said heating is carried out at a temperature of from about 185° to about 210°C., under a pressure of from about 85,000 psig and for a period of from about 10 to about 30 minutes.

13. The three-stage process for the preparation of a crystalline beryllium hydride-containing composite which comprises, in the first stage, pyrolyzing, while in solution in a solvent inert under the reaction conditions with respect to reactants and products and at a temperature in the range of from about 180° to about 210°C. sufficient to result in the formation of beryllium hydride, a mixture of a ditertiary alkyl beryllium etherate wherein each tertiary alkyl radical contains from four to about 20 carbon atoms and from about 0.5 to about 20 mole percent of a lithium compound selected from the group consisting of lithium hydride, lithium aluminum tetrahydride, and an alkyllithium wherein the alkyl radical contains from two to about eight carbon atoms, the pyrolysis being carried out under an atmosphere inert under the reaction conditions with respect to reactants and products, and separating the insoluble pyrolysis product;

in the second stage, heating said pyrolysis product under a pressure of from about 5 millimeters of mercury to about 10 atmospheres, at a temperature of from about 200° to about 300°C. and for a period of from about 2 to about 60 minutes to decompose part of said beryllium hydride to beryllium metal to form a beryllium hydride-beryllium metal composite and immediately cooling said hydride-metal composite to a temperature sufficiently low to inhibit further decomposition thereof; and in the third stage, heating said hydride-metal composite at a temperature of from about 150° to about 210°C., under a pressure of from about 50,000 to about 85,000 psig and for a period of from about 10 to about 30 minutes and cooling said composite to ambient temperature while maintaining said pressure.

14. The process of claim 13 wherein said lithium compound is n-butyl lithium and wherein said hydride-metal composite contains from about 5 to about 8 weight percent of beryllium metal.

15. The two-stage process for the preparation of a crystalline beryllium hydride-containing composite which comprises, in the first stage, pyrolyzing, while in solution, in a solvent inert under the reaction conditions with respect to reactants and products, under a pressure of from about 5 millimeters of mercury to about 10 atmospheres, at a temperature of from about 200° to about 300°C. and for a period of from about 2 to about 60 minutes, a mixture of a ditertiary alkyl beryllium etherate wherein each tertiary alkyl radical contains from four to about 20 carbon atoms and from about 0.5 to about 20 mole percent of a lithium compound selected from the group consisting of lithium hydride, lithium aluminum tetrahydride, and an alkyllithium wherein the alkyl radical contains from two to about eight carbon atoms, to produce beryllium hydride and, simultaneously to decompose part of said beryllium hydride to beryllium metal to form a beryllium hydride-metal composite and immediately cooling said hydride-metal composite to a temperature sufficiently low to inhibit further decomposition thereof; and in the second stage, heating said hydride-metal composite at a temperature of from about 150° to about 210°C., under a pressure of from about 50,000 to about 85,000 psig and for a period of from about 10 to about 30 minutes and cooling said composite to ambient temperature while maintaining said pressure.

16. The process of claim 15 wherein said lithium compound is n-butyl lithium and wherein said hydride-metal composite contains from about 5 to about 8 weight percent of beryllium metal.

17. The three-stage process for the preparation of a crystalline beryllium hydride-containing composite, which comprises, in the first stage, pyrolyzing, while in solution in a solvent inert under the reaction conditions with respect to reactants and products, and at a temperature in the range of from about 180° to about 210°C. sufficient to result in the formation of beryllium hydride, a mixture of a tertiary alkyl beryllium etherate wherein each tertiary alkyl radical contains from four to about 20 carbon atoms and about 0.5 to about 20 mole percent of a lithium compound selected from the group consisting of lithium hydride, lithium aluminum tetrahydride and an alkyllithium wherein the alkyl radical contains from two to about eight carbon atoms, the pyrolysis being carried out under an atmosphere inert under the reaction conditions with respect to reactants and products and separating the insoluble pyrolysis product;

in the second stage, mixing intimately said pyrolysis product with from about 2 to about 5 weight percent, based on said pyrolysis product, of a fluoride selected from the group consisting of the fluorides of the alkali metals of atomic numbers from 3 to 55, inclusive, the fluorides of the alkaline earth metals of atomic numbers from 4 to 56, inclusive, bismuth trifluoride, silver monofluoride and mixtures of two or more of said fluorides, to produce an amorphous beryllium hydride-containing composite; and in the third stage, heating said amorphous beryllium hydride-containing composite at a temperature of from about 150° to about 300°C. under a pressure of from above 30,000 to about 100,000 psig and for a period of from about 5 minutes to about 2 hours to produce a crystalline beryllium hydride-containing composite and cooling said crystalline composite to ambient temperature while maintaining said pressure.

18. The process of claim 17 wherein said lithium compound is n-butyl lithium, said metal fluoride is potassium fluoride and said heating is carried out at a temperature of from about 185° to about 210°C., under a pressure of from about 50,000 to about 85,000 psig and for a period of from about 10 to about 30 minutes.

* * * * *